(12) United States Patent
Yang et al.

(10) Patent No.: US 11,574,436 B2
(45) Date of Patent: Feb. 7, 2023

(54) MIXED RENDERING SYSTEM AND MIXED RENDERING METHOD FOR REDUCING LATENCY IN VR CONTENT TRANSMISSION

(71) Applicant: HTC Corporation, Taoyuan (TW)

(72) Inventors: Jung-Sen Yang, Taoyuan (TW);
Jing-Lung Wu, Taoyuan (TW);
Cheng-Wei Tsai, Taoyuan (TW);
Jiun-Lin Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/343,728

(22) Filed: Jun. 9, 2021

(65) Prior Publication Data

US 2021/0390769 A1    Dec. 16, 2021

Related U.S. Application Data

(60) Provisional application No. 63/037,582, filed on Jun. 10, 2020.

(51) Int. Cl.
*G06T 15/50* (2011.01)
*G06T 19/00* (2011.01)
*G06F 3/01* (2006.01)
*G06V 20/62* (2022.01)

(52) U.S. Cl.
CPC ............ *G06T 15/503* (2013.01); *G06F 3/011* (2013.01); *G06T 19/00* (2013.01); *G06V 20/62* (2022.01)

(58) Field of Classification Search
CPC ....... G06T 15/503; G06T 19/00; G06V 20/62; G06F 3/011
See application file for complete search history.

(56) References Cited

U.S. PATENT DOCUMENTS

| | | | | |
|---|---|---|---|---|
| 2011/0314093 | A1* | 12/2011 | Sheu | G06F 3/14 709/203 |
| 2012/0105473 | A1* | 5/2012 | Bar-Zeev | G06T 1/20 345/633 |
| 2013/0328762 | A1* | 12/2013 | McCulloch | G06F 3/017 345/156 |
| 2018/0190020 | A1 | 7/2018 | Mullins | |
| 2019/0230142 | A1* | 7/2019 | He | H04N 21/64738 |
| 2020/0090324 | A1* | 3/2020 | Li | G06F 3/01 |

FOREIGN PATENT DOCUMENTS

| | | |
|---|---|---|
| CN | 107274469 | 10/2017 |
| CN | 107274469 A * | 10/2017 |
| CN | 111223187 | 6/2020 |

OTHER PUBLICATIONS

"Office Action of Taiwan Counterpart Application", dated Jan. 12, 2022, p. 1-p. 15.

\* cited by examiner

*Primary Examiner* — Terrell M Robinson
(74) *Attorney, Agent, or Firm* — JCIPRNET

(57) ABSTRACT

The disclosure provides a mixed rendering system and a mixed rendering method. The mixed rendering system includes a client device configured to perform: determining at least one user-interactable object of a virtual environment; rendering the at least one user-interactable object; receiving a background scene frame of the virtual environment; blending the at least one rendered user-interactable object with the background scene frame as a visual content of the virtual environment; and providing the visual content of the virtual environment.

15 Claims, 1 Drawing Sheet

MIXED RENDERING SYSTEM AND MIXED RENDERING METHOD FOR REDUCING LATENCY IN VR CONTENT TRANSMISSION

CROSS-REFERENCE TO RELATED APPLICATION

This application claims the priority benefit of U.S. provisional application Ser. No. 63/037,582, filed on Jun. 10, 2020. The entirety of the above-mentioned patent application is hereby incorporated by reference herein and made a part of this specification.

BACKGROUND OF THE INVENTION

1. Field of the Invention

The disclosure generally relates to a rendering technology, in particular, to a mixed rendering system and a mixed rendering method.

2. Description of Related Art

Remote virtual reality (VR) solution provides a solution to allow low end VR device to experience satisfying quality VR content by streaming from remote powerful graphics server, such as playing SteamVR content on a mobile VR device. However, to achieve smooth streaming, the remote server is required to compress/encode the rendered frame and transmit to the VR device to decode and display. This process usually introduces image quality drop and latency, and both hurts the VR experience.

SUMMARY OF THE INVENTION

Accordingly, the disclosure is directed to a mixed rendering system and a mixed rendering method, which may be used to solve the above technical issue.

In the embodiments of the disclosure, the disclosure provides a mixed rendering system including a client device. The client device is configured to perform: determining at least one user-interactable object of a virtual environment; rendering the at least one user-interactable object; receiving a background scene frame of the virtual environment; blending the at least one rendered user-interactable object with the background scene frame as a visual content of the virtual environment; and providing the visual content of the virtual environment.

In the embodiments of the disclosure, the disclosure provides a mixed rendering method, adapted to a client device of a mixed rendering system. The method includes: determining, by the client device, at least one user-interactable object of a virtual environment; rendering, by the client device, the at least one user-interactable object; receiving, by the client device, a background scene frame of the virtual environment; blending, by the client device, the at least one rendered user-interactable object with the background scene frame as a visual content of the virtual environment; and providing, by the client device, the visual content of the virtual environment.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
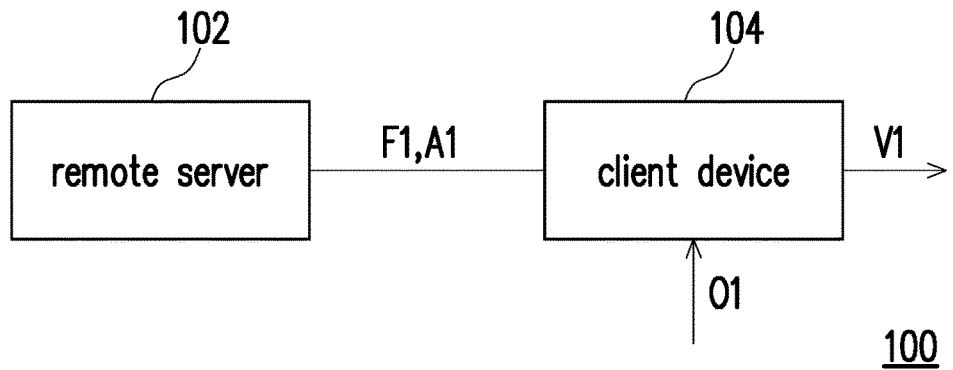
FIG. 1 shows a schematic diagram of a mixed rendering system according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, which shows a schematic diagram of a mixed rendering system according to an embodiment of the disclosure. In FIG. 1, the mixed rendering system 100 includes a remote server 102 and a client device 104. In various embodiments, the client device 104 may be any device that could be used to run a VR service, such as a standalone head-mounted display (HMD), a computing device (e.g., a personal computer or the like), etc., but the disclosure is not limited thereto.

In the embodiment of the disclosure, the remote server 102 connected with the client device 104 may be any device configured with high graphic processing capability. Roughly speaking, when the client device 104 runs the VR service to provide a visual content to the user, the remote server 102 may help the client device 104 to render some parts of the virtual environment of the VR service and transmit the rendered parts to the client device 104. Meanwhile, the client device 104 may render some specific objects of the virtual environment by itself and blend these rendered specific objects with the above rendered parts received from the remote server 102 as the visual content for providing/displaying to the user of the client device 104. Detailed discussion would be provided in the following.

Figure 2:
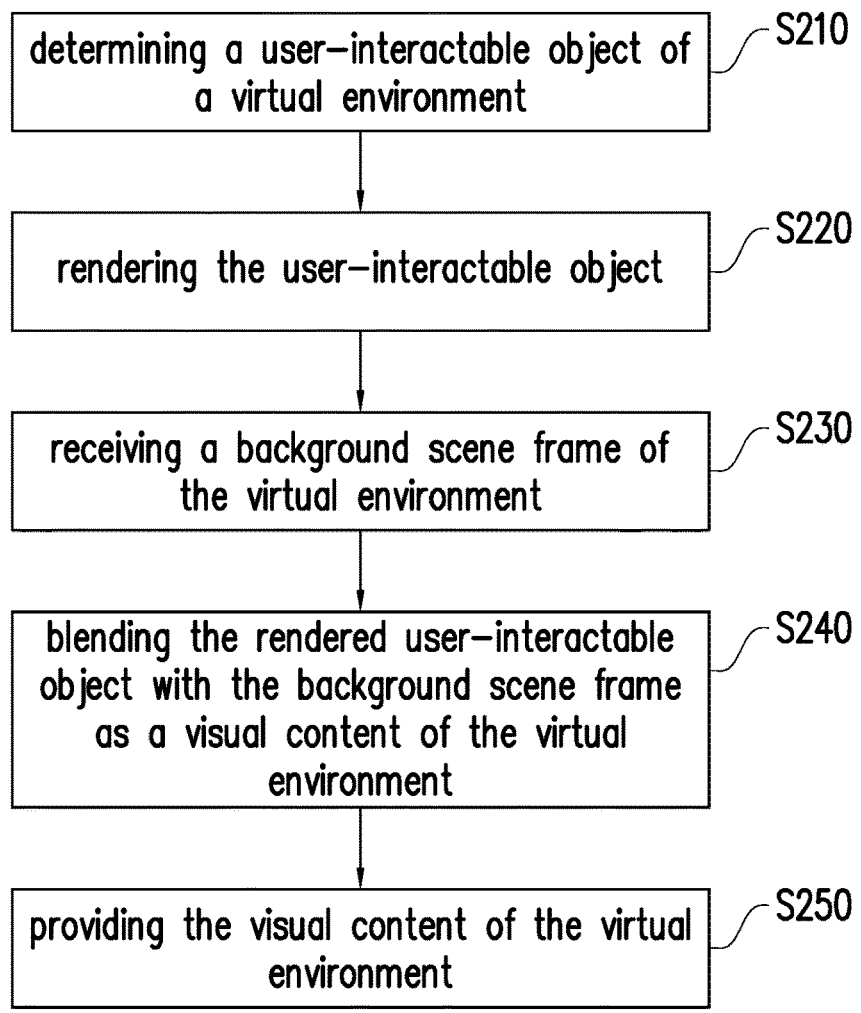
FIG. 2 shows a flow chart of a mixed rendering method according to an embodiment of the disclosure.

See FIG. 2, which shows a flow chart of a mixed rendering method according to an embodiment of the disclosure. In the present embodiment, the method of FIG. 2 may be executed by the client device 104 in FIG. 1, and hence the details of each step in FIG. 2 would be discussed in accompanying with the elements shown in FIG. 1, but the disclosure is not limited thereto.

Firstly, in step S210, the client device 104 may determine a user-interactable object O1 of a virtual environment. In various embodiments, the client device 104 may determine the user-interactable object O1 based on the teachings in at least one of the following embodiments.

In a first embodiment, the client device 104 may belong to a VR system for providing the VR service corresponding to the virtual environment. In one embodiment, the VR system may include an HMD connected with the client device 104. In other embodiments, the client device 104 may be the HMD. In these cases, the virtual environment may include a user representative object corresponding to the HMD, wherein the user representative object may be the object that corresponds to the user/HMD in the virtual environment, but the disclosure is not limited thereto. In one embodiment, the user representative object may move in the virtual environment in response to the movement of the HMD, but the disclosure is not limited thereto.

In the first embodiment, the user-interactable object O1 may be a virtual object spaced from the user representative object within a predetermined distance. From another perspective, the client device 104 may obtain the distance between the user representative object and each of other objects in the virtual environment and define those objects spaced from the user representative object by a distance less than the predetermined distance as the user-interactable object O1. In brief, the client device 104 may determine the virtual object near the user representative object as the user-interactable object O1, but the disclosure is not limited thereto.

In a second embodiment, the VR system may further include a handheld controller connected with the client device 104, and the virtual environment may include a controller representative object corresponding to the handheld controller. In the second embodiment, the user-interactable object O1 may include a virtual object spaced from the controller representative object within a predetermined distance. From another perspective, the client device 104 may obtain the distance between the controller representative object and each of other objects in the virtual environment and define those objects spaced from the controller representative object by a distance less than the predetermined distance as the user-interactable object O1. In brief, the client device 104 may determine the virtual object near the controller representative object as the user-interactable object O1, but the disclosure is not limited thereto.

In a third embodiment, the client device 104 may define the controller representative object as the user-interactable object O1, but the disclosure is not limited thereto.

In a fourth embodiment, the controller representative object may move in the virtual environment along with the handheld controller. That is, when the user physically moves the handheld controller while immersing in the VR service, the controller representative object would be moved in the virtual environment in response to the movement of the handheld controller. In this case, the client device 104 may predict a moving path of the controller representative object within a predetermined time. In various embodiments, the client device 104 may predict the moving path of the controller representative object based on any conventional movement prediction technology. For example, the client device 104 may predict the move path of the controller representative object based on, for example, the historical moving speeds, rotation angles of the controller representative object, but the disclosure is not limited thereto. In one embodiment, since the controller representative object may move in response to the movement of the handheld controller, the client device 104 may predict the move path of the controller representative object based on, for example, the historical moving speeds, rotation angles of the handheld controller, but the disclosure is not limited thereto.

Next, the client device 104 may obtain one or more virtual object on the moving path of the controller representative object within the predetermined time and define the one or more virtual object on this moving path as the user-interactable object O1.

In a fifth embodiment, the client device 104 may predict a moving path of the user representative object within a predetermined time. For example, the client device 104 may predict the move path of the user representative object based on, for example, the historical moving speeds, rotation angles of the user representative object, but the disclosure is not limited thereto. In one embodiment, since the user representative object may move in response to the movement of the HMD, the client device 104 may predict the move path of the user representative object based on, for example, the historical moving speeds, rotation angles of the HMD, but the disclosure is not limited thereto.

Next, the client device 104 may obtain one or more virtual object on the moving path of the user representative object within the predetermined time and define the one or more virtual object as the user-interactable object O1.

In other embodiments, the client device 104 may determine one or more user-interactable object O1 based on at least one of the teachings in the first to fifth embodiment. For example, the client device 104 may determine the virtual objects near the user representative object and/or the controller representative object as the one or more user-interactable object O1. Additionally or alternatively, the client device 104 may determine the virtual objects on the predicted moving path of the user representative object and/or the controller representative object as the one or more user-interactable object O1. Additionally or alternatively, the client device 104 may further determine the controller representative object as one of the one or more user-interactable object O1, but the disclosure is not limited thereto.

In other embodiments, the remote server 102 may be configured to determine the user-interactable object O1 based on the principles taught in the first to fifth embodiment and accordingly notify the client device 104 for the client device 104 to determine the user-interactable object O1, but the disclosure is not limited thereto.

With the user-interactable object O1, in step S220, the client device 104 may render the user-interactable object O1. From another perspective, the one or more user-interactable object O1 may be roughly understood as the virtual objects near the user representative object and/or more likely to be interacted with the user. For this kind of virtual objects, the client device 104 may determine to render these virtual objects by itself to better guarantee the quality and latency, such that the user may have better VR experiences, but the disclosure is not limited thereto.

Next, in step S230, the client device 104 may receive a background scene frame F1 of the virtual environment. In one embodiment, the remote server 102 may determine a background part of the virtual environment, render the background part as the background scene frame F1, and transmit the background scene frame F1 to the client device 104, but the disclosure is not limited thereto. In one embodiment, the remote server 102 may determine the user-interactable object O1 based on the same principles used by the client device 104 for determining the user-interactable object O1. Next, the remote server 102 may determine the parts other than the user-interactable object O1 as the background part, but the disclosure is not limited thereto. In other embodiment, the client device 104 may notify the remote server 102 about the user-interactable object O1, and the remote server 102 may accordingly determine the parts other than the user-interactable object O1 as the background part.

In general, the content of the background part is less visually important than the user-interactable object O1. Therefore, the remote server 102 may help the client device 104 to render the background part as the background scene frame F1 for reducing the loading of the client device 104, but the disclosure is not limited thereto.

In step S240, the client device 104 may blend the rendered user-interactable object O1 with the background scene frame F1 as a visual content V1 of the virtual environment. As mentioned in the above, since the user-interactable object O1 is rendered by the client device 104, the user-interactable object O1 may provide a better quality with low latency to the user.

In other embodiments, the remote server 102 may determine a text-rich object in the virtual environment and render the text-rich object. In some embodiments, the text-rich object may include some specific objects not belonging to the background part, such as a VR menu that includes certain amount of text, but the disclosure is not limited thereto. In this case, the render the text-rich object as an additional image μl and transmit the additional image μl to the client device 104. Accordingly, the client device 104 may further blend the additional image μl with the rendered user-interactable object O1 and the background scene frame F1 as the visual content V1 of the virtual environment.

In some embodiments, the remote server 102 may transmit the additional image μl and the background scene frame F1 by using different streams with different frame rates. For example, since the additional image μl may be less important than the background scene frame F1, the remote server 102 may transmit the additional image μl by using a stream with lower frame rate, while transmitting the background scene frame F1 by using a stream with higher frame rate, but the disclosure is not limited thereto.

With the visual content V1, in step S250, the client device 104 may provide the visual content V1 of the virtual environment. In one embodiment, the client device 104 may display the visual content V1 for the user to see. Accordingly, the user may have better VR experiences since the rendered user-interactable object O1 are presented with high quality and low latency.

In some embodiments, since the background scene frame F1 may be broken due to packet lost if the networking latency is too high for retransmission. In this case, the client device 104 may determine whether a frame part of the background scene frame F1 has a decoding error. In one embodiment, in response to determining that the decoding error occurs at a first frame part of the background scene frame F1, the client device 104 may obtain a second frame part of a previous background scene frame, wherein the second frame part corresponds to the first frame part. In one embodiment, assuming that the background scene frame F1 is an i-th frame from the remote server 102, the previous background scene frame may be an (i-k)-th frame from the remote server 102, wherein i is an index and k may be any integer (e.g., 1), but the disclosure is not limited thereto.

In one embodiment, the relative position between the first frame part and the background scene frame F1 may the same as the relative position between the second frame part and the previous background scene frame, but the disclosure is not limited thereto.

Next the client device 104 may re-project the second frame part as a third frame part and replace the first frame part with the third frame part. In one embodiment, the client device 104 may re-project the second frame part as the third frame part based on asynchronous time warp (ATW), but the disclosure is not limited thereto. Accordingly, after the client device 104 blends the user-interactable object O1 with the background scene frame F1 (whose first frame part has been replaced with the third frame part) as the visual content V1, the client device 104 may provide the visual content V1 without decoding error to the user, such that the user experience would not be affected by the first frame part with the decoding error, but the disclosure is not limited thereto.

In summary, the embodiment of the disclosure may determine the user-interactable objects in the virtual embodiments based on one or more principles taught in the first to fifth embodiments and let the client device to render the user-interactable objects by itself. After receiving the background scene frame from the remote server, the client device may blend the rendered user-interactable objects with the background scene frame to generate the visual content for the user to see. Since the user-interactable objects are rendered by the client device, the quality and latency of the rendered user-interactable objects in the visual content may be better guaranteed, which would improve the user experience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mixed rendering system, comprising:
a client device, configured to perform:
  determining at least one user-interactable object of a virtual environment;
  rendering the at least one user-interactable object;
  receiving a background scene frame of the virtual environment;
  blending the at least one rendered user-interactable object with the background scene frame as a visual content of the virtual environment; and
  providing the visual content of the virtual environment;
wherein the client device comprises a head-mounted display of a virtual reality system or comprises a computing device connected with the head-mounted display;
wherein the virtual reality system comprises at least one handheld controller connected with the client device, and provides a virtual reality service corresponding to the virtual environment;
wherein the virtual environment comprises a user representative object corresponding to the head-mounted display of the virtual reality system and at least one controller representative object corresponding to the at least one handheld controller;
wherein each of the at least one user-interactable object comprises a virtual object spaced from at least one of the user representative object and each controller representative object within a predetermined distance.

2. The mixed rendering system according to claim 1, wherein the at least one user-interactable object further comprises the at least one controller representative object corresponding to the at least one handheld controller.

3. The mixed rendering system according to claim 1, wherein the at least one controller representative object moves along with the at least one handheld controller, and the client device is further configured to perform:
  predicting a moving path of each controller representative object within a predetermined time;
  obtaining at least one virtual object on the moving path of each controller representative object within the predetermined time; and
  defining the at least one virtual object as the at least one user-interactable object.

4. The mixed rendering system according to claim 1, wherein the client device is further configured to perform:
  predicting a moving path of the user representative object within a predetermined time;
  obtaining at least one virtual object on the moving path of the user representative object within the predetermined time; and defining the at least one virtual object as the at least one user-interactable object.

5. The mixed rendering system according to claim 1, further comprising a remote server connected to the client device and configured to perform:
    determining a background part of the virtual environment;
    rendering the background part as the background scene frame; and
    transmitting the background scene frame to the client device.

6. The mixed rendering system according to claim 5, wherein the remote server is further configured to perform:
    determining a text-rich object in the virtual environment;
    rendering the text-rich object as an additional image; and
    transmitting the additional image to the client device, wherein the client device further blends the additional image with the at least one rendered user-interactable object and the background scene frame as the visual content of the virtual environment.

7. The mixed rendering system according to claim 6, wherein the remote server transmits the additional image and the background scene frame by using different streams with different frame rates.

8. The mixed rendering system according to claim 1, wherein the client device is further configured to perform:
    in response to determining that a decoding error occurs at a first frame part of the background scene frame, obtaining a second frame part of a previous background scene frame, wherein the second frame part corresponds to the first frame part; and
    re-projecting the second frame part as a third frame part and replacing the first frame part with the third frame part.

9. A mixed rendering method, adapted to a client device of a mixed rendering system, wherein the method comprises:
    determining, by the client device, at least one user-interactable object of a virtual environment;
    rendering, by the client device, the at least one user-interactable object;
    receiving, by the client device, a background scene frame of the virtual environment;
    blending, by the client device, the at least one rendered user-interactable object with the background scene frame as a visual content of the virtual environment; and
    providing, by the client device, the visual content of the virtual environment;
    wherein the client device comprises a head-mounted display of a virtual reality system or comprises a computing device connected with the head-mounted display;
    wherein the virtual reality system comprises at least one handheld controller connected with the client device, and provides a virtual reality service corresponding to the virtual environment;
    wherein the virtual environment comprises a user representative object corresponding to the head-mounted display of the virtual reality system and at least one controller representative object corresponding to the at least one handheld controller;
    wherein each of the at least one user-interactable object comprises a virtual object spaced from at least one of the user representative object and each controller representative object within a predetermined distance.

10. The mixed rendering method according to claim 9, wherein the at least one user-interactable object further comprises the at least one controller representative object corresponding to the at least one handheld controller.

11. The mixed rendering method according to claim 9, wherein the at least one controller representative object moves along with the at least one handheld controller, and the step of determining at least one user-interactable object of a virtual environment comprises:
    predicting a moving path of each controller representative object within a predetermined time;
    obtaining at least one virtual object on the moving path of each controller representative object within the predetermined time; and
    defining the at least one virtual object as the at least one user-interactable object.

12. The mixed rendering method according to claim 9, wherein the step of determining at least one user-interactable object of a virtual environment comprises:
    predicting a moving path of the user representative object within a predetermined time;
    obtaining at least one virtual object on the moving path of the user representative object within the predetermined time; and
    defining the at least one virtual object as the at least one user-interactable object.

13. The mixed rendering method according to claim 9, wherein the mixed rendering system further comprises a remote server connected to the client device, and the method further comprises:
    determining, by the remote server, a background part of the virtual environment;
    rendering, by the remote server, the background part as the background scene frame;
    determining, by the remote server, a text-rich object in the virtual environment;
    rendering, by the remote server, the text-rich object as an additional image;
    transmitting, by the remote server, the background scene frame and the additional image to the client device, wherein the additional image and the background scene frame are transmitted by using different streams with different frame rates; and
    blending, by the client device, the additional image with the at least one rendered user-interactable object and the background scene frame as the visual content of the virtual environment.

14. The mixed rendering method according to claim 9, further comprising:
    in response to determining that a decoding error occurs at a first frame part of the background scene frame, obtaining, by the client device, a second frame part of a previous background scene frame, wherein the second frame part corresponds to the first frame part; and
    re-projecting the second frame part as a third frame part and replacing the first frame part with the third frame part.

15. A mixed rendering method, adapted to a client device of a mixed rendering system, wherein the method comprises:
    determining, by the client device, at least one user-interactable object of a virtual environment;
    rendering, by the client device, the at least one user-interactable object;
    receiving, by the client device, a background scene frame of the virtual environment from a remote server of the mixed rendering system;

blending, by the client device, the at least one rendered user-interactable object with the background scene frame as a visual content of the virtual environment; and providing, by the client device, the visual content of the virtual environment;

wherein the client device comprises a head-mounted display of a virtual reality system or comprises a computing device connected with the head-mounted display;

wherein the virtual reality system comprises at least one handheld controller connected with the client device, and provides a virtual reality service corresponding to the virtual environment;

wherein the virtual environment comprises a user representative object corresponding to the head-mounted display of the virtual reality system and at least one controller representative object corresponding to the at least one handheld controller representative object corresponding to the at least one handheld controller;

wherein the at least one controller representative object moves along with the at least one handheld controller, and the step of determining at least one user-interactable object of a virtual environment comprises:

predicting a moving path of at least one of the user representative object and each controller representative object within a predetermined time;

obtaining at least one virtual object on the moving path of at least one of the user representative object and each controller representative object within the predetermined time; and defining the at least one virtual object as the at least one user-interactable object.

\* \* \* \* \*